United States Patent
Schmidt et al.

(10) Patent No.: US 8,923,286 B2
(45) Date of Patent: Dec. 30, 2014

(54) METHOD AND APPARATUS FOR SAFETY-RELATED COMMUNICATION IN A COMMUNICATION NETWORK OF AN AUTOMATION SYSTEM

(75) Inventors: Joachim Schmidt, Bad Pyrmont (DE); Steffen Horn, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 679 days.

(21) Appl. No.: 12/878,496

(22) Filed: Sep. 9, 2010

(65) Prior Publication Data

US 2011/0069698 A1 Mar. 24, 2011

(30) Foreign Application Priority Data

Sep. 23, 2009 (DE) .......................... 10 2009 042 354

(51) Int. Cl.
*H04L 12/28* (2006.01)
*H04L 12/701* (2013.01)
*H04L 12/46* (2006.01)
*H04L 12/403* (2006.01)

(52) U.S. Cl.
CPC .............. *H04L 12/403* (2013.01); *H04L 45/00* (2013.01); *H04L 12/462* (2013.01)
USPC ........................................................ 370/389

(58) Field of Classification Search
None
See application file for complete search history.

(56) References Cited

U.S. PATENT DOCUMENTS

| | | | |
|---|---|---|---|
| 5,943,673 A * | 8/1999 | Felouzis et al. ........................ 1/1 |
| 5,957,985 A * | 9/1999 | Wong et al. .................. 701/29.2 |
| 6,915,444 B2 * | 7/2005 | Vasko et al. .................... 714/4.4 |
| 7,103,511 B2 * | 9/2006 | Petite ............................ 702/188 |
| 7,289,861 B2 * | 10/2007 | Aneweer et al. .............. 700/110 |
| 7,293,080 B1 * | 11/2007 | Clemm et al. ................. 709/223 |
| 8,077,733 B2 * | 12/2011 | Matsuo ......................... 370/401 |
| 2002/0122394 A1 * | 9/2002 | Whitmore et al. ............ 370/328 |
| 2002/0142730 A1 * | 10/2002 | Hsu ................................. 455/72 |
| 2003/0154302 A1 * | 8/2003 | Rosenblum ................... 709/238 |
| 2003/0223436 A1 * | 12/2003 | Lohrmann et al. ............ 370/401 |
| 2004/0044744 A1 * | 3/2004 | Grosner et al. ............... 709/217 |
| 2004/0078419 A1 * | 4/2004 | Ferrari et al. ................. 709/201 |
| 2004/0078467 A1 * | 4/2004 | Grosner et al. ............... 709/226 |
| 2004/0111523 A1 * | 6/2004 | Hall et al. ..................... 709/230 |

(Continued)

FOREIGN PATENT DOCUMENTS

DE 19904893 A1 8/2000
DE 19928517 A1 1/2001

(Continued)

OTHER PUBLICATIONS

Kargl, F., "Secure Vehicular Communication Systems: Implementation, Performance, and Research Challenges", Dec. 30, 2009.*

(Continued)

*Primary Examiner* — Ayaz Sheikh
*Assistant Examiner* — Faiyazkhan Ghafoerkhan
(74) *Attorney, Agent, or Firm* — Kaplan Breyer Schwarz & Ottesen, LLP

(57) ABSTRACT

The invention relates to communication between safety-related modules in a communication network of an automation system. The object of the invention is to simplify installation and development of safety-related modules in an automation network. To this end, the safety functions of a system are divided into small, manageable, locally delimitable and simply verifiable groups of modules.

10 Claims, 2 Drawing Sheets

(56) References Cited

U.S. PATENT DOCUMENTS

| | | | |
|---|---|---|---|
| 2004/0156352 A1* | 8/2004 | Freeman et al. | 370/351 |
| 2004/0158340 A1* | 8/2004 | Fischer et al. | 700/97 |
| 2004/0158713 A1* | 8/2004 | Aneweer et al. | 713/166 |
| 2004/0264402 A9* | 12/2004 | Whitmore et al. | 370/328 |
| 2005/0144437 A1* | 6/2005 | Ransom et al. | 713/151 |
| 2005/0251296 A1* | 11/2005 | Tracy Nelson et al. | 700/292 |
| 2006/0067209 A1* | 3/2006 | Sheehan et al. | 370/216 |
| 2006/0203804 A1* | 9/2006 | Whitmore et al. | 370/352 |
| 2006/0287784 A1* | 12/2006 | Kanki | 701/29 |
| 2007/0030114 A1* | 2/2007 | Rieger | 340/3.1 |
| 2007/0083348 A1* | 4/2007 | Fischer et al. | 703/6 |
| 2007/0146118 A1* | 6/2007 | Rodriguez et al. | 340/5.71 |
| 2007/0248027 A1* | 10/2007 | Roberts et al. | 370/254 |
| 2007/0297425 A1* | 12/2007 | Chirco | 370/401 |
| 2008/0137589 A1* | 6/2008 | Barrett | 370/327 |
| 2008/0225762 A1* | 9/2008 | Soliman | 370/310 |
| 2008/0240105 A1* | 10/2008 | Abdallah | 370/392 |
| 2009/0177356 A1* | 7/2009 | Plawecki | 701/45 |
| 2009/0290695 A1* | 11/2009 | Schulzrinne et al. | 379/93.02 |
| 2011/0069698 A1* | 3/2011 | Schmidt et al. | 370/351 |

FOREIGN PATENT DOCUMENTS

| | | |
|---|---|---|
| DE | 1211582 A1 | 6/2002 |
| DE | 10151119 A1 | 4/2003 |
| DE | 202006017615 U1 | 2/2007 |
| DE | 202006017615 U1 | 3/2007 |
| DE | 102006017615 A1 | 10/2007 |
| DE | 102006018163 A1 | 10/2007 |
| DE | 102007025892 A1 | 12/2008 |
| DE | 102007039428 A1 | 2/2009 |
| DE | 102007050708 A1 | 6/2009 |
| DE | 102007050708 B4 | 8/2009 |
| DE | 202008003988 U1 | 8/2009 |
| DE | 202008003988 U1 | 9/2009 |
| EP | 1054309 A2 | 11/2000 |
| EP | 1211582 A1 | 6/2002 |
| EP | 1533673 A2 | 5/2005 |
| EP | 1653308 A1 | 5/2006 |
| EP | 1686767 A1 | 8/2006 |
| EP | 1738233 B1 | 1/2007 |
| EP | 1738233 B1 | 5/2008 |
| EP | 1923759 A2 | 5/2008 |
| EP | 1923759 A3 | 5/2008 |

OTHER PUBLICATIONS

European Patent Office, European Office Action for International Appliation No. 10009765.8-1244 dated Nov. 18, 2010, Publisher: European Patent Office, Published in: EP.

Bruegger, B., "Virtuell Vernetzt Ethernet-Technik Fuer Local Und Metropolitan Area Networks", "NET—Zeitschrift Fuer Kommunikationsmanagement", Jan. 1, 2001, pp. 48-50, vol. 55, No. 10, Publisher: NET Verlagsservice / ISSN: 0947-4765, Published in: DE.

Nettesheim, Johannes, Related EP Patent Application No. 10008717 Search Report, Oct. 15, 2012, Published in: EP.

English opposition (Gramm_Lins_Partner) dated Oct. 7, 2011 of German Patent Application DE 10 2009 042 354 B4.

English opposition (Magenbauer_Kollegen) dated Oct. 6, 2011 of German Patent Application DE 10 2009 042 354.

English opposition (Wilhelm Beck) dated Oct. 7, 2011 of German Patent Application DE 10 2009 042 354 B4.

German opposition (Gramm Lins Partner) dated Oct. 7, 2011 of German Patent Application DE 10 2009 042 354 B4.

German opposition (Magenbauer Kollegen) dated Oct. 7, 2011 of German Patent Application DE 10 2009 042 354 B4.

German opposition (Wilhelm Beck) dated Oct. 7, 2011 of German Patent Application DE 10 2009 042 354 B4.

Beckhoff—New Automation Technology (E2).

Beckhoff—PC Control—The New Automation Technology Magazine.

EtherCat vom Jun. 10, 2011.

Beckhoff PC control—The New Automation Technology Magazine (E7).

Beckhoff PC control—The New Automation Technology Magazine (D9).

Beckhoff PC control—The New Automation Technology Magazine (E5).

PROFIBUS Technologie and Anwendung (Gramm Lins Partner) (Anlage E5).

Beckhoff—TwinCAT Schulung (E2A).

Windows NT 7.Okt. 2011.

Windows NT System Administration.

Dipl-Ing. Hauber, German Office Action for International Application No. 10 2009 042 354.0-31, Mar. 23, 2010, Publisher: German Patent Office, Published in: DE.

EPO, "Opposition by Festo AG & Co. Against EP Patent #EP 2 301 841", Oct. 7, 2012, Publisher: EPO, Published in: EP.

EPO, "Opposition by WAGO Kontakttechnik GmbH & Co. KG Against EP Patent #EP 2 302 841", Oct. 18, 2012, Publisher: EPO, Published in: EP.

"Related Chinese Patent Application No. 201010290447.9 Office Action", May 29, 2013, Publisher: CIPO, Published in: CN.

Aeleen Frisch, "Windows NT System-Administration", 1998, pp. 1-11, Published in: DE.

"Article Safety-over-EtherCAT", "PC-Control", Jan. 2007, pp. 22-27, Published in: DE.

Profibus, "Systembeshreibung", Oct. 2002, pp. 1-42, Published in: DE.

\* cited by examiner

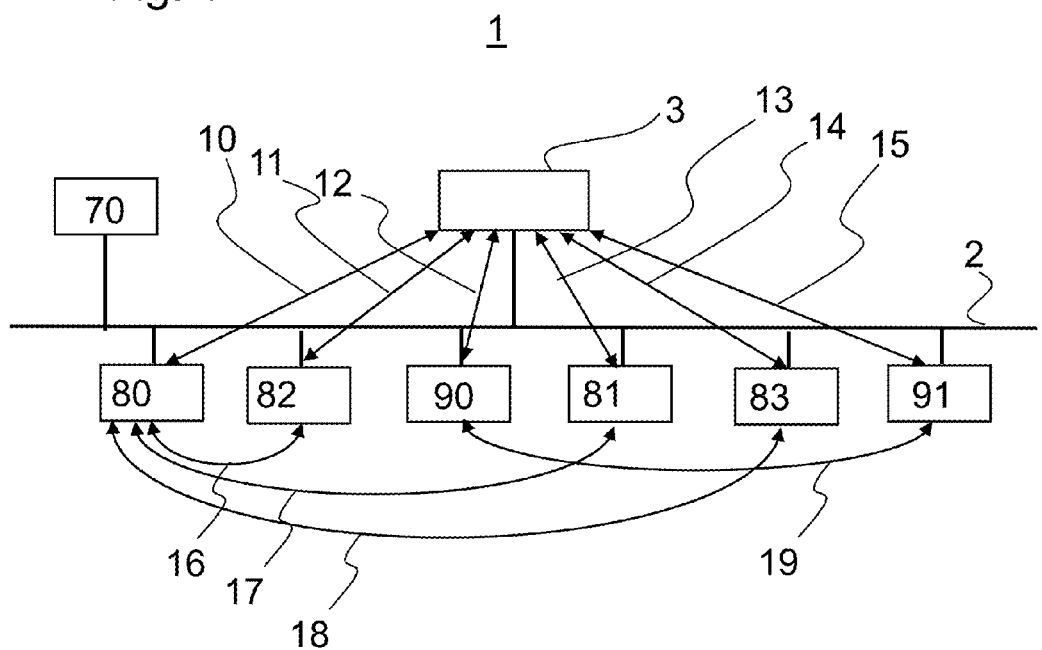

METHOD AND APPARATUS FOR SAFETY-RELATED COMMUNICATION IN A COMMUNICATION NETWORK OF AN AUTOMATION SYSTEM

CROSS-REFERENCE TO RELATED APPLICATIONS

German patent application DE 10 2009 042 354.0, filed Sep. 23, 2009, is incorporated herein by reference.

FIELD OF THE INVENTION

The present invention generally relates to automation systems and automation bus systems thereof. More particularly, the invention relates to communication between safety-related modules in a communication network of such an automation system.

BACKGROUND OF THE INVENTION

Reducing a risk for human beings and the environment often requires providing safety functions in automation bus systems and the subscribers connected thereto. An example is the stop of a machine connected to the automation bus system when an emergency stop switch is actuated. To this end, error-proof automation systems are increasingly applied. In general these error-proof automation systems realize on the one hand the proper safety function, such as two-hand control, muting, operation mode selection switch, etc., and on the other hand error detection and error controlling steps such as set forth for example in standards IEC 61508 and ISO 13849.

In present automation systems, communication systems which connect local input/output devices (I/O devices) and controls are used, depending on the automation level and the dimension of the system. For transferring safety-related data it is known to support the network with secure network protocols. Heretofore, the employed signal flow emanates from a central safety apparatus in which the secure input signals are transferred to a secure controller, are processed therein, and then transferred to respective actuators. This secure processing is also referred to as a secure application.

Communication errors can exist or arise in the hardware and firmware of the automation devices, in infrastructure components of the network such as field bus or Ethernet components, and during data transfer, due to external influences. An example for external influences is interference in data transfer caused by electro-magnetic fields.

In automation technology there are presently two tendencies. On the one hand, efforts are taken to decentralize control functions. Furthermore there is an interest to integrate safety technology into the control and network apparatus.

With decentralization the control function is more and more transferred into the output level. For example in drives the control function can be integrated to a limited extend.

However, integration of safety technology into controls and networks produces strong dependencies in the application process. A result of these dependencies is that development and programming of the systems becomes more complex. This is in some way contradictory to the desirability of easy handling of the safety technology. The complexity of development of safety-related applications has been until now one of the essential reasons for the sluggish acceptance of a transition from conventional hard-wired safety technology, in particular on the basis of safety relays. Additionally, present secure automation bus systems are prone to erroneous use and lacking availability of the controlled system caused by so called faulty activation due to the problems mentioned above.

SUMMARY OF THE INVENTION

The object of the invention therefore is to simplify the installation and development of safety-related modules in an automation network.

To achieve this object, a basic idea of the invention is to divide the safety functions of a system into small, manageable, locally delimitable and simply verifiable groups of modules. Thus, the groups of modules designated to perform a safety-related action are more or less self-sustaining islands in the overall communications network.

This architecture corresponds to the present thinking of persons skilled in safety technology when developing system automation. Also, in this way it is possible to modify and extend the system more easily without the requirement to re-verify system parts that have already been verified. Moreover, modularization and separation of the safety function from standard functions accommodate the requirements of current safety standards such as the standards IEC 61508 and ISO 13849 mentioned above to the highest degree.

Another advantage for an applicant results from the possibility to adapt the local safety modules to be independent from the network and independent from control, where appropriate. This results in an independency from the vendor of the control. This also means that in case the standard control or the network is exchanged, for example due to non safety-related requirements, the applied safety technology and the verified safety modules can be retained.

According to the invention, the local safety modules shall be adapted to provide error-proof communication with each other, at least to a limited extent, to ensure the overall safety function. To facilitate this independently from the underlying physical medium, the verification of a communication in conformity to the safety requirements is delegated to the receiving subscriber. This eliminates a safety master which is provided in some known systems.

For communication among the modules of one island, i.e. a group of modules, to perform a safety-related action the telegrams are transmitted to a communication master and thence routed to the recipient. Automatic routing of the data flow is implemented by the error-proof communication protocols and/or the error-proof communication subscribers providing information or means which can be assessed by the routing layers. Assessing herein means that the copy or routing table self-establishes in an initializing stage, without requiring the applicant to predefine the addresses of the communication subscribers by means of a network configuration tool. The means or information can be provided and assessed either once in an initialization stage or during the runtime of the system.

In particular, to achieve the above object the invention provides an automation system comprising a particularly non-safe communication master and a plurality of local modules, wherein
said local modules are adapted as network subscribers, and are connected to said communication master via a communication network, wherein
communication between said local modules in said communication network is realized via telegrams, wherein
at least two of said modules are safety modules between which safety-related data are transferred and which form a logical group of modules for performing a safety-related function,
and wherein
said preferably non-safe communication master maintains a routing table which stores logical connections between said local safety modules in accordance with said safety-related function, wherein
said communication master is adapted to control automatic routing of data from a transmitting safety module to a receiving safety module in function of said routing table
such that each communication among the safety modules of one logical group occurs via two point-to-point connections, namely from the transmitting safety module to the communication master and then from the communication master to the receiving safety module,
wherein the receiving safety module is adapted to perform a safety-related action according to the received data, and
wherein the communication network includes a means to retrieve information from said safety modules for establishing a routing table, and to establish said routing table on the basis of said information.

Preferably, the means for establishing the routing table is implemented in the communication master itself. However, it is also conceivable for the routing table to be generated by an external means such as an additional module connected to the network, and then to be communicated to the communication master.

These features of an automation system accordingly provide for a method for monitoring safety functions in an automation system which comprises a particularly non-safe communication master and a plurality of local modules, wherein
said local modules are adapted as network subscribers, and are connected to said communication master via a communication network, wherein
communication between said local modules in said communication network is realized via telegrams, wherein
at least two of said modules are safety modules between which safety-related data are transferred and
which form a logical group of modules for performing a safety-related function,
and wherein
said preferably non-safe communication master maintains a routing table which stores logical connections between said local safety modules in accordance with said safety-related function, wherein
said communication master automatically routes data from a transmitting safety module to a receiving safety module in function of said routing table
such that each communication among the safety modules of one logical group occurs via two point-to-point connections, namely from the transmitting safety module to the communication master and then from the communication master to the receiving safety module,
wherein the receiving safety module performs a safety-related action according to the received data, and wherein a means of said communication network, preferably the communication master, retrieves information from said safety modules for establishing a routing table, and establishes said routing table on the basis of said information.

The term routing table does not mean a strict mapping in form of a table. Rather, in the sense of the invention this term is to be understood as any form of allocation instruction in which the safety modules, i.e. the addresses thereof, are associated according to the logical connections to be established.

A routing table according to one embodiment of the invention can be provided in form of a copy list. Copying may be performed by copying complete telegrams or data thereof in the application program or a communication firmware of the communication master.

The feature of a non-safe communication master means that the communication master do not need to be adapted for error-proof communication by means of a secure network protocol and/or do not need to comprise specific redundant hardware.

One of the major advantages of the invention is that a central configuration tool for configuring the safety modules and safety-related actions thereof can be completely dispensed with.

Safety-related communication requires fast data transfer. Here, the method of the invention with its routing via a non-safe communication master seems to be cumbersome at first, since each telegram has to be transferred via two point-to-point connections, and additionally has to be routed. However, it has been shown that the communication speed is comparable with that of other safety systems with communication over the bus, so that the requirements of a fast response time are met.

As a basis for data traffic in the communication network, standard network communication can be used. Among others, these are INTERBUS-, PROFIBUS-, PROFINET-, DeviceNet-, and Ethernet IP systems. The associated secure network protocols INTERBUS-Safety, PROFIsafe, or CIP-Safety can be used for secure communication between the safety modules. These error-proof network protocols function according to the "black channel" principle in which the error-proof telegram is embedded into a standard telegram. Here, a communication subscriber takes the role of the secure communication master, for example by means of a master safety layer, or in form of an F host.

BRIEF DESCRIPTION OF THE DRAWINGS

The invention will now be described in detail with reference to the attached drawings in which the same reference numerals indicate the same or equivalent components. In the drawings:

FIG. 1 is a schematic block diagram of an automation network of an automated manufacturing system;

FIG. 2 illustrates an exemplary embodiment of a routing table for the automation network shown in FIG. 1.

DETAILED DESCRIPTION

Figure 3:
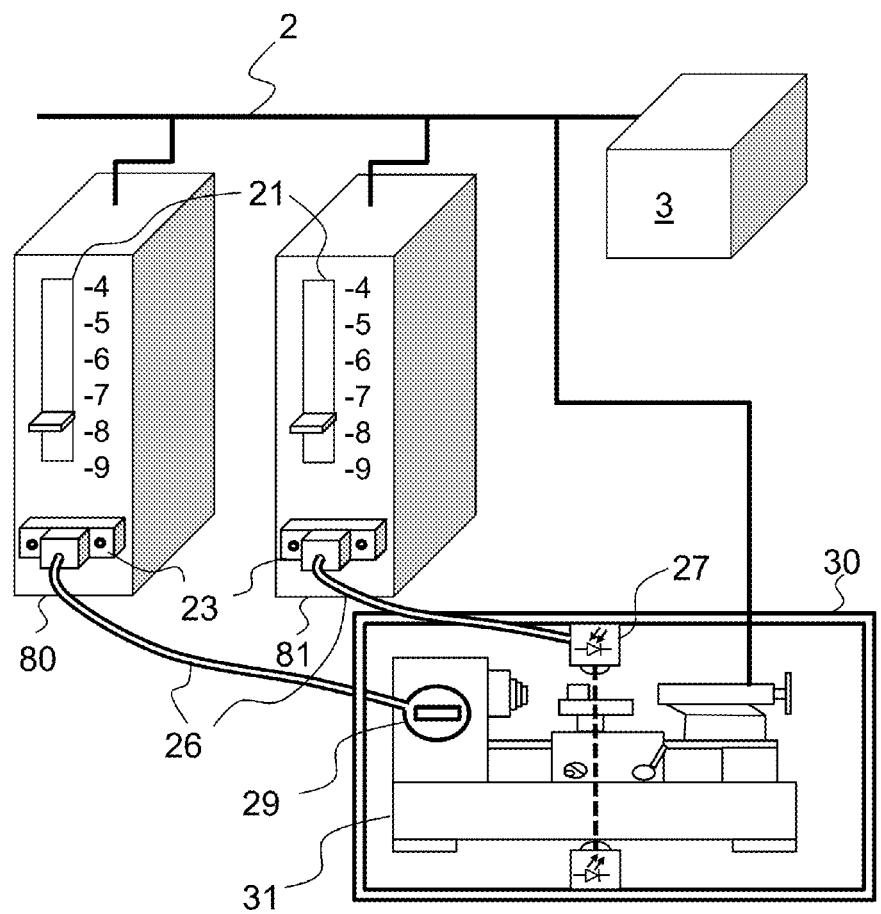
FIG. 3 illustrates an exemplary embodiment with input and output modules.

FIG. 1 illustrates a schematic block diagram of the communication network of an automation system 1, preferably an automated manufacturing system.

An automation system 1 according to the invention comprises a communication master, for example as a component of a central control, and a plurality of local modules. In the example of FIG. 1 a communication master 3 is provided as a central controller or as a component thereof. Local modules 70, 80, 81, 82, 83, 90, 91 are connected to a communication network 2.

Local modules 70, 80, 81, 82, 83, 90, 91 are adapted as network subscribers and connected to the communication master 3 through communication network 2. Communication between local modules 70, 80, 81, 82, 83, 90, 91 in communication network 2 is performed by means of telegrams. For example, communication network 2 may comprise an Ethernet network as physical layer, and communication may accordingly be implemented with Ethernet telegrams.

Furthermore, at least two of the modules are safety modules between which safety-related data are transferred. In particular, in the example of FIG. 1 modules 80, 81, 82, 83, 90, 91 are adapted as safety modules. The safety modules form a single or a plurality of logical groups of modules to perform a safety-related function.

Communication master 3 maintains a routing table in which logical connections between local safety modules 80, 81, 82, 83, 90, 91 are stored in accordance with the safety-related function. Communication master 3 is adapted to perform automatic routing of data from the respective transmitting safety module to the receiving safety module as controlled by the routing table. The receiving safety module is adapted to perform a safety-related action according to the received data.

In particular, communication master 3 does not have to be safe in the sense of the standards mentioned above. Rather, the central controller can be a standard controller.

In the example shown in FIG. 1 point-to-point connections 10, 11, 12, 13, 14, 15 exist between communication master 3 and safety modules 80, 81, 82, 83, 90, 91. The routing table further stores logical connections 16, 17, 18, 19 used to perform the various safety-related functions. By means of this routing table communication master 3 automatically routes the data which are transmitted from the respective transmitting safety modules to the associated receiving safety modules. The safety modules linked by a logical connection form a respective logical group of modules for performing a safety-related function. Accordingly, in the example shown in FIG. 1 safety modules 80, 81, 82, 83 form a logical group wherein each of safety modules 81, 82, 83 is linked to safety module 80 by a respective logical connection 16, 17, 18. Additionally, a logical group comprised of safety modules 90, 91 is linked via logical connection 19.

To give an example, one of the safety modules can assess data from a light barrier. A device which has its access monitored by this light barrier can be arranged to be stopped. A corresponding stop means receives a confirmation by another safety module in response to a telegram transmitted from the safety module to which the light barrier is connected, and routed by communication master 3 to the other safety module.

Thus, each of the logical connections is composed of two point-to-point connections from and to communication master 3. For example, logical connection 16 of the exemplary embodiment shown in FIG. 1 is implemented by point-to-point connections 10 and 11. In this way, any point-to-point protocol can be employed for the underlying communication. An Ethernet network as a basis is preferred.

Especially, the communication of safety-related data in telegrams can be performed via a non-safe channel over the telecommunications network. In other words, the same communication medium as used for standard data is used for process control. This is especially advantageous in terms of reduction of hardware complexity and facilitating implementation into already existing automation systems. To obtain high reliability in the transfer of safety-related data, a "black channel" principle is employed wherein the detection of telegram errors is entirely delegated to the receiving safety module. Accordingly, in this modification of the invention for error-proof transfer of safety-related data the receiving safety module is adapted to detect errors with regard to permutation, corruption, misrouting or deterioration of telegrams.

To this end, the receiving safety module may check a received telegram for at least one and preferably all of the following characteristics:
the time stamp,
redundancy,
a check sum,
a sequential telegram number,
a transmitter identity
a receiver identity.

In particular, from the transmitter and receiver identities of the telegrams the receiving safety module may determine whether the association of source and destination of the telegrams is correct and unambiguous.

The "black channel" principle assumes any errors such as permutation, deterioration, and corruption of telegrams in communication network 2. The error detecting means of the error-proof communication protocol which is used for communication between the safety modules especially do not take credit from the error detecting means that are also provided for standard traffic, if applicable.

An exemplary routing table 20 for the logical connections shown in FIG. 1 is illustrated in FIG. 2.

The logical connections are stored in the first column. The second column defines the master address, and the third column defines the slave address. Here, the addresses of the respective output and input modules are referred to as a master and slave address. Preferably, an output module is used as a master; a reverse configuration is equally possible. The separation into master and slave safety modules is especially made with regard to error-proof communication. For example, the master can be adapted to check the sequential numbers of the telegrams and to determine therefrom whether the slave modules and the communication of these modules with the master safety module functions correctly.

Since in the example shown in FIG. 1 safety module 80 has a plurality of logical connections, this safety module has associate therewith a plurality of addresses in form of ports. In particular, address 80:1 with port 1 for logical connection 16 is associated with safety module 82, address 80:0 with port 0 for logical connection 17 with safety module 81, and address 80:2 with port 2 for logical connection 18 with safety module 83.

To reduce the complexity of initialization or development of the safety functions it is useful to adapt the central control to retrieve information from the safety modules for establishing a routing table, and to establish the routing table based on this information. Accordingly, in this case the safety modules are adapted to provide the required information.

Hence, the safety-related communication according to the invention is realized via the communication master, wherein the transmitting safety modules, i.e. safety modules 80 and 90 in the example of FIG. 1, always transmit to communication master 3 or the central control, respectively, which then transmits telegrams with the included information to the safety module with the destination address defined in the routing table. The advantage thereof is that neither the transmitting nor the receiving safety module needs information about which other safety module it is associated with to perform a safety-related function within a logical group.

In one embodiment of initialization of the non-safe central control with regard to the establishment of the routing table:
first, the configuration of the connected network is determined;
then the addresses, and more generally the identification information of the connected safety modules are determined;

if applicable, a plausibility check is performed;
from the information obtained in the first and second step an instruction or copy list for telegram routing in cyclic operation is established.

As an identification information of the safety module for automatic generation of the routing table or copy list the following can be used in particular:
an identification code,
a device ID,
a device name,
a secure address which for example may be set at the safety module by means of a switch.

Generally, initialization can be performed as follows using an algorithm implemented in the communication master: First the algorithm detects the safety modules in the network, for example from their ID codes, and then retrieves the secure addresses from these modules. Now it can be determined from the secure addresses that automatic routing is to be performed in the islands or logical groups, i.e. in the example of FIG. 1 among modules 80-83 at the one hand, and modules 90, 91 at the other hand. References or copy instructions are established according to logical connections 16 to 18 of the first island, and a reference or copy instruction is established according to logical connection 19 of the second island.

According to another embodiment of the invention, an association of the safety modules can be made by setting the address information of the communication master at the safety modules. This is suitable in a case with a plurality of communication masters 3 in the communication network where each communication master 3 is to be associated with an island, i.e. logical group of safety modules.

Transferring this to the example shown in FIG. 3, in this case communication master 3 has got number 8 or a corresponding address which is set at the address selection switches 21 of safety modules 80, 81. In the initializing stage, communication master 3 then retrieves the numbers or the corresponding addresses set at the safety modules, and so detects that it has modules 80, 81 associated therewith which are to form a logical group to perform a safety function.

The instruction or copy list here is one possible form of a routing table. According to one embodiment of the invention, passing the information to the receiving safety module can be realized by copying the complete telegrams in the application program or in the communication firmware of communication master 3. For this, copy lists (tables, etc.) can be established which then are processed in cyclic operation.

Using the error-proof network protocol, the respective receiving safety module can also determine whether the routing table maintained in the communication master is correct, and thereby whether the messages are routed to the right subscriber.

The copy lists for each copy request preferably always include a source address (source pointer), a destination address (destination pointer), and the length of the data to be copied.

When automatically establishing the routing table, which is exemplarily illustrated in FIG. 2, it is important not to enter dispensable or even false connections, i.e. to enter only right connections. False connections would be for example connections between safety modules of different logical groups. This could lead to a situation in which a signal from an emergency stop switch for a machine shuts off another machine.

To properly associate the connections among a logical group of safety modules when establishing the routing table, in some modifications of the invention communication master 3 is adapted to retrieve information from the safety modules connected to the communication network, and to determine from the retrieved information which safety modules belong to a logical group, and to realize the connections in the routing table according to that allocation of the safety modules.

There are several ways to do this. A simple way is to assess the address information of the safety modules. To this end, the addresses of the safety modules may be configured in a way to reflect or represent the membership in a logical group. One way to implement this is to have the communication master to associate each logical group to a respective specific address space. Another way is to have the safety modules be adapted to provide information via the communication network in response to a request, which information identifies the membership in a specific logical group. This information can be considered as a part of the address.

In the example illustrated in FIG. 1, the safety modules may have addresses which for example correspond to the associated reference numerals. Thus, the communication master can be adapted to map logical groups in the routing table according to address spaces 50-59, 60-69, 70-79, 80-89, 90-99, etc. by corresponding connection entries.

As can be seen from FIG. 1, all modules of one logical group e.g. have an address in the address space from 80 to 89, and the safety modules of the other logical group have addresses in the address space from 90 to 99. Accordingly, on the one hand connections between modules 80, 81, 82, 83, and on the other hand a connection between modules 90 and 91 is/are entered in the routing table.

For realizing various safety functions such as issuing a stop signal in response to an input signal, it is suitable for the safety modules of a group to have at least one safety module that comprises an input module, and at least one safety module that comprises output module. In this case, the input module with participation of the communication master sends a telegram to the output module via a logical connection composed of the two point-to-point connections, which output module then initiates a safety-related action in response to the telegram.

To identify the safety modules which belong to a logical group, for example upon installation of the automation system, the safety modules can be equipped with an address selection switch. Suitable for this are e.g. dip switches mounted to the housing.

The address for safe communication set in this or in another way does not need to be identical with the general network address. Rather, it can be a specific safety address. As is described below with reference to the example of FIG. 3, the allocation of the safety address or of another individual address information can be performed in a way to enable an algorithm implemented in the communication master to determine the membership of safety modules to a logical group and to establish the routing table accordingly by entering a connection of these safety modules. FIG. 3 shows one exemplary embodiment comprising safety modules in form of input and output modules.

For the sake of clarity, only safety modules 80 and 81 out of the logical group comprising safety modules 80, 81, 82, and 83 of the example of FIG. 1 are illustrated. Safety module 80 is an output module and receives messages from transmitting safety module 81 which is provided as an input module.

Each of safety modules 80, 81 has a port 23 for connection to sensors and actuators, respectively. Here, safety module 81 as an input module is connected to a sensor 27, and safety module 80 as an output module is connected to an actuator 29, via a respective lead 26. In the example shown in FIG. 3, sensor 27 is the sensor of a light barrier 30. Actuator 29 in this example is a safety relay which shuts off a machine 31 controlled by the automation network, e.g. a lathe.

Accordingly, the safety-related action in this example is the automatic stop of machine 31 in the event light barrier 30 is interrupted. This shall prevent any individual from coming into the vicinity of the running machine 31 and into danger.

In case of an interruption of light barrier 30 safety module 81 sends a telegram to communication master 3, triggered by the signal from sensor 27. Communication master 3 determines from its routing table that the telegram has to be passed to safety module 80, and routes the telegram accordingly. The receiving safety module 80 in response to the information about the triggering of the light barrier included in the telegram activates actuator 29 via port 23, i.e. here in particular an actuator 29 in form of a relay which switches in response to a signal at port 23, and thereby brings machine 31 into a safe condition.

Now, it is desirable to avoid complex configuration of the safety-related action when installing the system. In particular, it is desirable to enable linking of the individual safety modules of one logical group with its functions in a simple manner. In conventional safety technology, this is afforded by interconnecting the individual modules by means of wires.

For the configuration of an automation system according to the invention the safety modules can have an address switch 21. In this case, the membership of the safety modules in a logical group can be defined in simple manner by allocating addresses according to a predefined scheme. In the example of FIG. 3 respective address spaces can be selected using address switches 21, wherein an allocation to a specific logical group is obtained by selecting the same address space. In the example shown, using address selection switches 21 address spaces 40-49 (switch position 4), 50-59 (switch position 5), 60-69, 70-79, 80-89, and 90-99 can be selected. In the presented example, by positioning the address selection switch 21 at the numeral "8" the address space 80-89 has been selected to logically combine safety modules 80 and 81 in a group.

In an initializing stage the safety modules connected to the communication network are requested to provide its address. Thereupon, the safety modules return address information. Based on the determined allocation of the safety modules to a logical group the communication master can then establish the routing table including the corresponding associations.

It is not necessary for the address information to be complete. For example, each of safety modules 80, 81 may report the address space 80-89 it is associated with to the communication master which then in a second step may allocate a complete address to safety modules 80, 81. It is however preferred to retrieve complete safety addresses, wherein the address that is set by means of address selection switch 21 is allocated in addition to the complete safety address or is a component of the complete address.

Similar to the address allocation described above, the ports used by the receiving safety module 80 can be defined. For this, appropriate selecting switches can be provided which allow to define the ports for communication among the safety modules. In a case where an allocation of a specific port to a specific input module is not required for determining and performing the safety-related action, an allocation of the port addresses may occur automatically during the initializing stage.

It will be obvious for a person skilled in the art that the invention is not limited to the exemplary embodiments illustrated in the figures; rather various variations are possible within the scope of the appending claims.

What is claimed is:

1. An automated manufacturing system comprising:
a non-safe communication master of the automated manufacturing system, wherein the non-safe communication master is not configured for error-proof communication by means of a secure network protocol; and
a plurality of local network subscribers of the automated manufacturing system, the local network subscribers being connected to the non-safe communication master via a communication network,
wherein communication between the local network subscribers in the communication network is realized via telegrams,
wherein at least two of the local network subscribers i) are safety network subscribers between which safety-related data are transferred based on error-proof communication, wherein a verification of a communication in conformity to one or more safety requirements includes checking a received telegram by a receiving subscriber for at least one of the following characteristics: a time stamp, a transmitter identity, and a receiver identity, and ii) form a logical group of network subscribers for performing a safety-related function, and
wherein the non-safe communication master maintains a routing table that stores logical connections between the local safety network subscribers in accordance with the safety-related function, the non-safe communication master being configured to control automatic routing of data from a transmitting safety network subscriber to a receiving safety network subscriber in accordance with the routing table, such that each communication among the safety network subscribers of one logical group occurs via two point-to-point connections, namely from the transmitting safety network subscriber to the non-safe communication master and then from the non-safe communication master to the receiving safety network subscriber,
wherein the receiving safety network subscriber is configured to perform a safety-related action according to the received telegram, and
wherein the communication network includes a means to retrieve information from the safety network subscribers for establishing the routing table, and to establish the routing table on the basis of the information.

2. The automated manufacturing system according to claim 1, wherein the non-safe communication master is configured to perform the following steps to initialize the routing table:
a) determining a configuration of the communication network,
b) determining identification information of the safety network subscribers,
c) performing a plausibility check of the identification information determined, if applicable,
d) establishing an instruction or copy list for the routing of telegrams in cyclic operation from the information resulting from steps a) and b).

3. The automated manufacturing system according to claim 1, wherein the non-safe communication master is configured to retrieve information from the safety network subscribers connected to the communication network, and to determine from the retrieved information which safety network subscribers are allocated to a respective logical group, and to establish the logical connections in the routing table in accordance with the allocation of the safety network subscribers.

4. The automated manufacturing system according to claim 1, wherein addresses of the safety network subscribers are configured to reflect a collective allocation to a respective logical group.

5. The automated manufacturing system according to claim 1, wherein the transfer of safety-related data occurs in telegrams via a non-safe channel that is a communication medium for standard data as well as for safety-related data, and wherein, for error-proof transfer of the safety-related data, the receiving safety network subscriber is configured to detect errors with regard to permutation, corruption, misrouting or deterioration of telegrams.

6. The automated manufacturing system according to claim 5, wherein the receiving safety network subscriber checks a received telegram for at least one of the following characteristics:
 redundancy,
 a check sum, and
 a sequential telegram number.

7. The automated manufacturing system according to claim 6, wherein the non-safe communication master is configured to allocate logical groups to specific address spaces.

8. The automated manufacturing system according to claim 1, wherein among the safety network subscribers of a logical group there is at least one safety network subscriber that comprises an input module and at least one safety network subscriber that comprises an output module wherein the output module is configured to initiate a safety function in response to a telegram from an input module.

9. The automated manufacturing system according to claim 5, characterized in that the receiving safety network subscriber checks a received telegram for all of the following characteristics:
 a time stamp,
 redundancy,
 a check sum,
 a sequential telegram number,
 a transmitter identity
 a receiver identity.

10. A method for monitoring safety functions in an automated manufacturing system comprising a communication master that is not configured for error-proof communication by means of a secure network protocol and a plurality of local network subscribers, the local network subscribers being connected to the non-safe communication master via a communication network, and communication between the local network subscribers in the communication network being realized via telegrams, the method comprising:
 retrieving information from safety network subscribers for establishing a routing table that stores logical connections between the safety network subscribers in accordance with a safety-related function, wherein at least two of the local network subscribers i) are the safety network subscribers between which safety-related data are transferred based on error-proof communication, wherein a verification of a communication in conformity to one or more safety requirements includes checking a received telegram by a receiving subscriber for at least one of the following characteristics: a time stamp, a transmitter identity, and a receiver identity, and ii) form a logical group of network subscribers for performing the safety-related function;
 maintaining, at the non-safe communication master, the routing table on the basis of the information retrieved;
 automatically routing, through the non-safe communication master, data from a transmitting safety network subscriber to a receiving safety network subscriber in accordance with the routing table, such that each communication among the safety network subscribers of one logical group occurs via two point-to-point connections, namely from the transmitting safety network subscriber to the non-safe communication master and then from the non-safe communication master to the receiving safety network subscriber; and
performing, at the receiving safety network subscriber, the safety-related action according to the received telegram.

* * * * *